United States Patent [19]

Domenik et al.

[11] Patent Number: 4,694,412

[45] Date of Patent: Sep. 15, 1987

[54] RANDOM NUMBER GENERATOR FOR USE IN AN AUTHENTICATED READ-ONLY MEMORY

[75] Inventors: Stephen L. Domenik, Santa Cruz; Alan C. Folmsbee; Tai Nguyen, both of Santa Clara; David A. Shirgley, San Jose, all of Calif.

[73] Assignee: Intel Corporation, Santa Clara, Calif.

[21] Appl. No.: 782,078

[22] Filed: Sep. 30, 1985

Related U.S. Application Data

[62] Division of Ser. No. 421,513, Sep. 22, 1982.

[51] Int. Cl.⁴ .............................................. G06F 1/02
[52] U.S. Cl. .................................................... 364/717
[58] Field of Search .......................... 364/717; 331/78; 178/22.1, 22.14, 22.16, 22.18, 22.19; 380/44–47, 50, 52, 28

[56] References Cited

U.S. PATENT DOCUMENTS

| | | | |
|---|---|---|---|
| 3,777,278 | 12/1973 | Majean et al. | 331/78 |
| 3,963,905 | 6/1976 | Gopinath et al. | 331/78 |
| 3,984,668 | 10/1976 | Zetterberg et al. | 331/78 |
| 4,194,427 | 3/1980 | Deutsch | 364/717 |
| 4,318,008 | 3/1982 | Nall | 331/78 |
| 4,379,206 | 4/1983 | Aoki | 178/22.16 |
| 4,409,434 | 10/1983 | Basset et al. | 178/22.19 |
| 4,447,672 | 5/1984 | Nakamura | 178/22.19 |
| 4,450,321 | 5/1984 | Quigley et al. | 364/717 |

OTHER PUBLICATIONS

*Journal of Computainal Physics,* vol. 40, pp. 517–526 (1981) "A Very Fast Shift Register Sequence Random Number Generator", Kirpatrick et al.

"Fortune Wheel Process for Generating Pseudo-Random Numbers, by Thomas C. Anderson, *Instruments and Control Systems,* Jan., 1962, pp. 129–131.

*Primary Examiner*—Raulfe B. Zache
*Assistant Examiner*—Dale M. Shaw
*Attorney, Agent, or Firm*—Blakely, Sokoloff, Taylor & Zafman

[57] ABSTRACT

A random number generator is described. The output of two relatively fast digitally controlled oscillators are exclusively ORed and gated by a counter which has a counting rate determined by a relatively slow digitally controlled oscillator. The ORed output is accumulated in the accumulator. During the inactive period of the ORed gate, the counter is preset to a value which is a function of the digital value stored in the accumulator. Further, during this inactive period, selected output lines of the accumulator are also exclusively ORed and gated to shift the accumulated value. The final value of the accumulator is generated as a random number and further provides a seed number for varying the frequency of the two relatively fast oscillators which then provide the foundation for the next random number.

3 Claims, 8 Drawing Figures

RANDOM NUMBER GENERATOR

Fig. 5  ENCRYPTOR

DEPLETION DCO

ENHANCEMENT DCO

RANDOM NUMBER GENERATOR FOR USE IN AN AUTHENTICATED READ-ONLY MEMORY

This is divisional of application Ser. No. 421,513 filed Sept. 22, 1982.

BACKGROUND OF THE INVENTION

1. Field of the Invention

The invention relates to the field of copy protection of computer programs, particularly those stored in read-only memories.

2. Prior Art

Enormous resources are consumed in developing and writing computer programs. For a typical computer, the cost for producing an operating system can equal or exceed the cost of developing the computer itself. Beyond this, the cost of developing applications programs is generally very time-consuming and expensive.

Computer programs, while difficult to originally write, can generally be copied without special equipment. This is particularly true for computer programs stored on floppy disks or on magnetic tapes. In some cases, the programs are encrypted to prevent copying. Encryption, however, is not always desirable since it increases the cost to produce a program and deprives a legitimate user of his lawful right to make back-up copies of the program. And, while some spend considerable effort in encrypting computer programs, others work at breaking the encryption. In the personal computer field, there are those that openly sell programs which break copy-prevention systems, and permit copying of otherwise uncopyable programs. For general discussions of various encryption and cryptographic techniques, see U.S. Pat. Nos. 4,168,396; 4,200,770; 4,218,582; 4,268,911, and 4,278,837.

In recent years, integrated circuit densities have greatly increased, allowing programs to be more easily stored in read-only memories (ROMs). Even programmable read-only memories (PROMs) are available at reasonable cost which will store 128k bits. It is likely that densities will continue to increase and 256k bit PROMs, for example, will be available in the not too distant future. ROMs and PROMs have the advantage of storing programs that are immediately available to the user, that is, for instance, the program need not be transferred from a floppy disk to a RAM for execution. Programs in ROMs can generally be executed directly from these memories, and thus the programs themselves do not require RAM space.

The present invention deals with securing programs stored particularly in ROMs, PROMs and EPROMs. It prevents the programs from being read from these memories until certain conditions are met such as a memory being inserted into a particular system. With the present invention the program itself need not be encrypted, although it may be for added security.

SUMMARY OF THE INVENTION

An apparatus for controlling access to a memory is described. The apparatus includes a generator means for generating a random digital signal. First encryption means provide first predetermined encryption for the random digital signals from the generator means. Second encryption means are used for providing second predetermined encryption for the random digital signals from the generator means. A comparator means compares the two encrypted signals from the first encryption means and second encryption means. The comparator means provides a signal which enables access to the memories as a function of the comparison. For example, if the first and second encryption means provide the same encryption, then the comparator means compares the outputs of these means to determine if they are the same, and, if they are, then access to the memory is permitted. In the presently preferred embodiment the first encryption means, generator means and comparator are integrally formed within the memory while the second encryption means is part of a system.

DETAILED DESCRIPTION OF THE INVENTION

An apparatus for securing data and programs stored within memories is described. In the following description, numerous specific details are set forth such as specific memories, number of bits, etc., in order to provide a thorough understanding of the present invention. However, it will be obvious to one skilled in the art that the present invention may be practiced without these specific details. In other instances, well-known circuits, etc., have not been set forth in detail in order to not unnecessarily obscure the present invention.

The present invention in its preferred embodiment is described in conjunction with metal-oxide-semiconductor (MOS), erasable programmable, read-only memories (EPROMs). The present invention may be practiced with other memories, such as mask programmed memories (both bipolar and MOS) as well as other types of memories.

The present invention provides a locking device which prevents access to the contents of a memory until predetermined conditions are met. For instance, the memory cannot be accessed until the memory is placed in a particular environment such as in a particular system. This prevents the casual user from duplicating the contents of the memory with, for example, an ordinary device used for duplicating the contents of ROMs. Thus, casual users can be prevented from duplicating data and programs stored in the memory. (Those employing sophisticated equipment may nonetheless be able to read the contents of the ROMs and duplicate them, although this is made more difficult with the present invention. As will be discussed, even if duplication occurred, it may not be useful.)

GENERAL CONCEPT OF PRESENT INVENTION (FIGS. 1-3)

Figure 1:
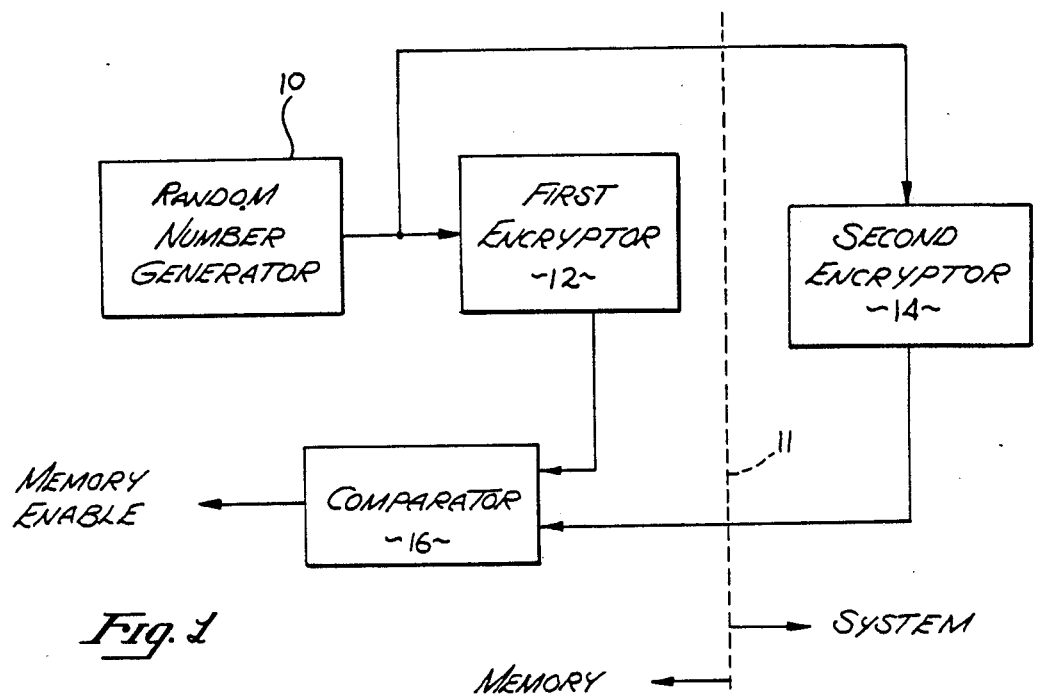
FIG. 1 is a block diagram used to describe the present invention.

Referring now to FIG. 1, the apparatus of the present invention includes a random number generator 10 which generates random (pseudo-random) digital numbers. The random numbers generated by generator 10 are coupled to a first encryptor 12 and also to a second encryptor 14. The first encryptor 12 encrypts the random number in any one of a plurality of ways using ordinary circuitry such as logic gates, etc. (A specific encryptor is discussed in conjunction with FIG. 5.) The random number from generator 10 is also encryted by a second encryptor 14. For the embodiment shown in FIG. 1, encryptor 12 and encryptor 14 may perform identical encryption. Comparator 16 compares the results of the encryption performed by the encryptors 12 and 14. Encryptors 12 and 14 perform encryption, then comparator 16 compares the results of the encryption performed by both encryptors, and if the digital numbers are identical, it provides an output signal which enables memory access.

Line 11 of FIG. 1 is used to indicate that in practice the first encryptor 12, comparator 16 and random number generator 10 may be all integral with a memory. The second encryptor which is to the right of line 11 is incoporated in a system in which the memory is used such as a computer. The second encryptor may be a separate integrated circuit within the system or may be incoporated within a CPU, other memory or other component of the computer system.

Since the first encryptor and second encryptor are realized as integrated circuits the specific encryption algorithm incorporated within the encryptors cannot readily be determined. It would require careful etching away of the layers in the integrated circuit to uncover the underlying encryption circuitry. This is a very difficult task and not one which will be undertaken by a casual user. (In the presently preferred embodiment, the encryption algorithm is determined by a programmable key which is even more difficult to physically detect.) Examining random numbers from the generator 10 and the results of the encryption performed by the encryptors does not reveal the underlying algorithm or key implemented by the encryptors. Particularly where a large random number is used (e.g., 32 bits) with a large key (e.g., 64 bits) millions of random numbers and encrypted numbers would have to be examined before the key could be detected. Indeed, this would be a lengthy process even with a sophisticated computer. (In practice, by making the encryption a slow process (e.g., 1 sec.) decades are required to "break" the key.)

Assume the generator 10, encryptor 12 and comparator 16 are part of a ROM. When power is applied to the ROM, the ROM will include, for example, a bi-stable circuit (flip-flop) which has an imbalanced load so that when intially activated, its state is known. In its initial state, this circuit will prevent access to the memory by, for example, disabling one or more timing signals. Thus, until the state of this binary circuit is changed, access to the contents of the memory is not possible. If the memory is plugged into a system which includes the second encryptor 14, then random numbers from the generator 10 will be identically encrypted by encryptors 12 and 14, and comparator 16 will provide an output memory enabling signal. This signal changes the state of the bistable circuit allowing access to the memory. Thus, in order to access the memory, it must be within a system having a predetermined second encryptor 14. Thus the contents of the memory cannot be copied in an ordinary PROM duplicator.

Once the memory is enabled in the system its contents can be read presumably only by the system. It is, of cours, possible for a user to then read the contents of the memory and duplicate it. However, such duplication may not be of much value since the duplicated memory would not provide the same "hand shake" as the orginal memory (since it lacks the encryptor). Thus, the duplicated memory would likely be much more difficult to use.

Figure 2:
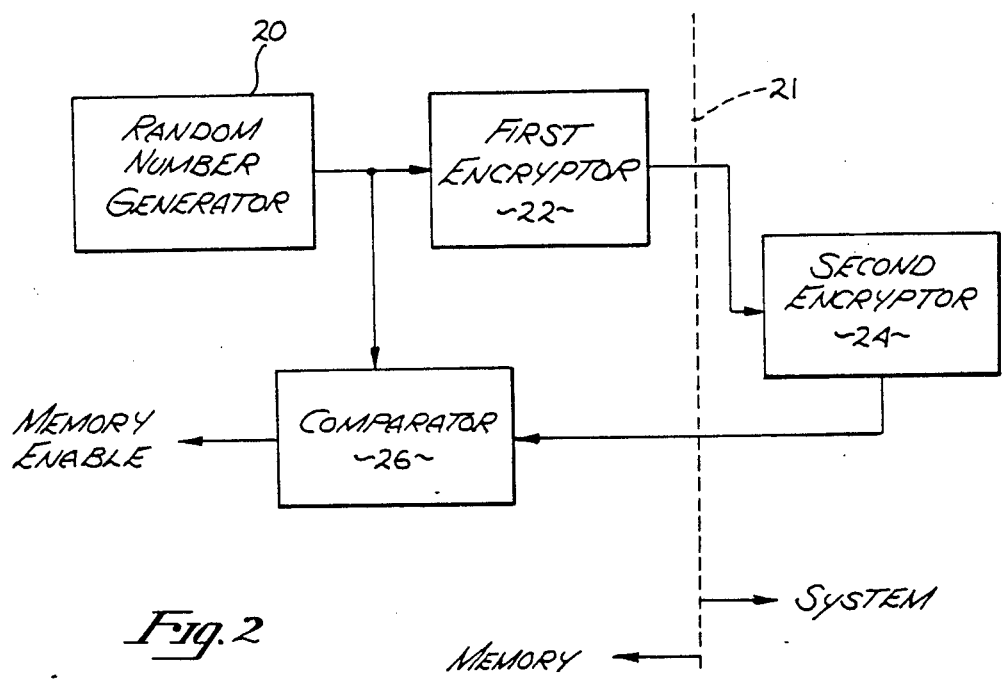
FIG. 2 is a block diagram used to describe an alternate embodiment of the present invention.

For the embodiment of FIG. 2 a random number generator again is employed which may be identical to the random number generator of FIG. 1. The generator 20 provides random digital numbers which are coupled to a first encryptor 22 and also to a comparator 26. The results of the encryption performed by the first encrypton 22 are coupled to a second encryptor 24. The results of this second encryption are coupled to the comparator 26. As shown, the generator 20, encryptor 22 and comparator 26 are part of a memory with the output of the comparator 26 enabling memory access. The second encryptor 24 which is shown to the right of line 21 is part of a system and, again may be part of another memory, CPU, etc. For the embodiment of FIG. 2, the second encryptor 24 performs the inverse encryption of first encryptor 22. Therefore, comparator 26 performs a direct comparison and provides a memory enabling signal when the output of the second encryptor 24 matches the random number generated by the generator 20. (Inverse encryption is difficult to perform, and generally not preferred.)

Figure 3:
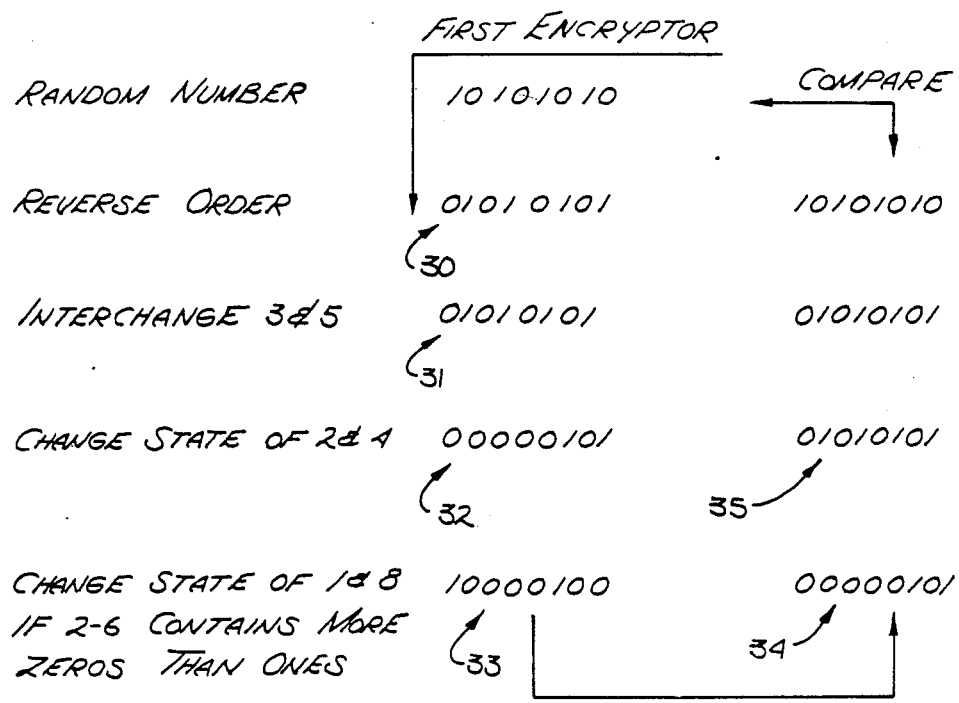
FIG. 3 illustrates encryption performed by first and second encryptors; this figure is used to describe the operation of the system of FIG. 2.

The following example is for illustration only and does not provide good security: Assume that generator 20 generates an 8-bit random digital number when power is applied to the memory. Assume further that as shown in FIG. 3, the generator 20 provides the digital number 10101010. This number is coupled both to the first encryptor 22 and the comparator 26. Assume further that the first encryptor 22 includes logic circuitry which performs the following encryption. First, it reverses the order of the random number; secondly, it interchanges the third and fifth bits; third, it changes the state of the second and fourth bits; and finally, it changes the state of the first and eighth bits if the bits 2-6 contain more zeros than ones. Examining this in FIG. 3, line 30 shows the results of the random number with the order reversed. Line 31 shows the digital word after the third and fifth bits have been interchanged (assuming bits are numbered from left to right). Since both the third and fifth bits are zeros, line 30 and 31 are the same. On line 32, the random number is again shown with the state of the second and fourth bits changed, thus the number is 00000101. Since the bits 2-6 on line 32 contain more zeros than ones, the states of bits 1 and 8 are changed as shown on line 33. Thus, the digital word 10000100 is coupled to the second encryptor 24. Now the second encryptor performs the inverse encryption. First, it examines bits 2-6 to determine if there are more zeros than ones, and since there are, it changes the state of the first and eighth bits as shown at line 34. Next, the state of bits 2 and 4 are changed as shown at line 35. Once again, interchanging of the third and fifth bits does not affect the word, and thus, the second encryptor provides 10101010 to the comparator after the bits are reversed. The comparator 26 compares the two digital words and finding them identical, enables access to the memory.

PRESENTLY PREFERRED EMBODIMENT OF INVENTION

Figure 4:
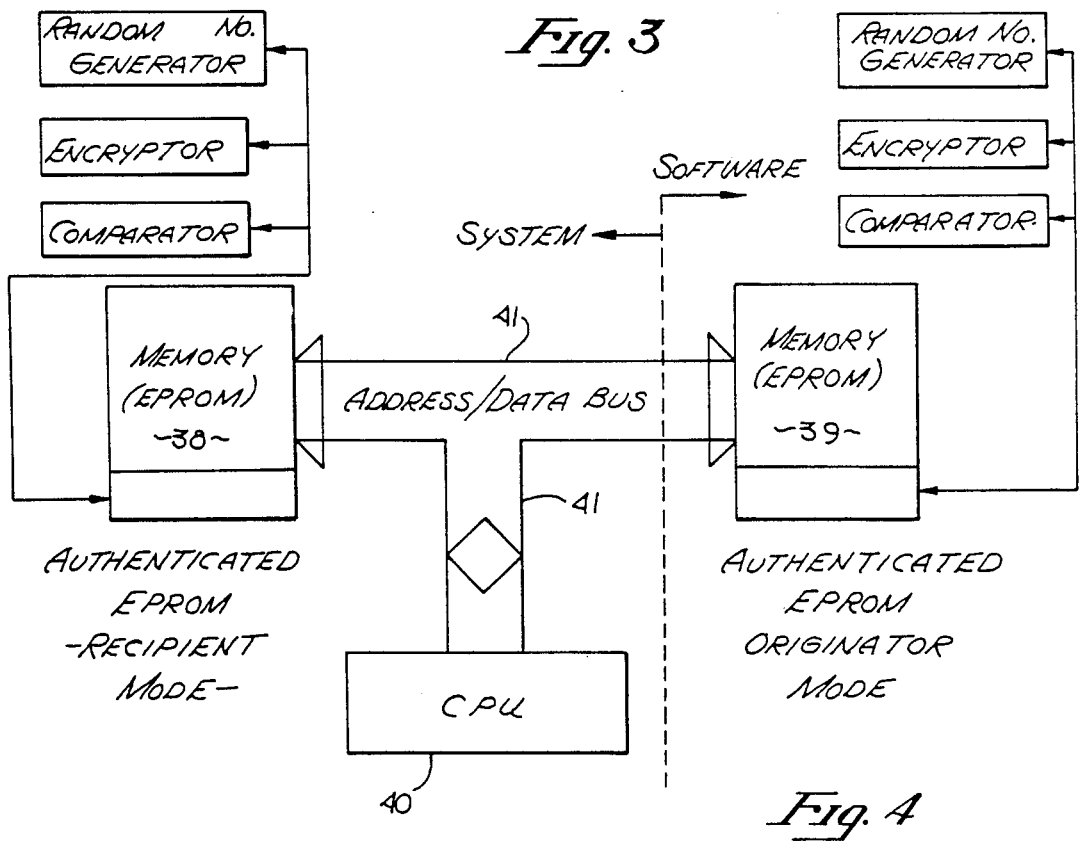
FIG. 4 is a block diagram illustrating the use of the presently preferred embodiment of the invention which employs two programmable memories.

Referring now to FIG. 4, in the presently preferred embodiment two initially identical electrically programmable read-only memories (PROMs) are employed to implement the present invention. The encryption apparatus of the present invention is integrated within a 128k EPROM (Intel 27128). As shown in FIG. 4, one memory 38 is included within a computer system which includes central processing unit 40 and the address/data bus 41. The other memory 39 which contains, for instance, a program to be run within the system is coupled to the bus 41. The memory 39 may be included within a cartridge which easily engages the bus 41.

Each of the memories 38 and 39 includes a random number generator, an encryptor circuit and a comparator. The memory 38 operates in a recipient mode and only its encryptor circuit is activated. The other memory 39 operates in an orginator mode and its random number generator, encryptor and comparator all are activated. (The activation of one of these modes may be implemented with a mode signal or by programming within the EPROMs. For example, the permanent grounding or floating of a pin can be used to select the modes.)

Both the memory 38 and 39 are programmed with the same 64 bit key (representing an encryption algorithm). The key can be an arbitrary digital number known only to the PROM manufacturer or proprietor of a program stored in the memory, for instance. The random generator within memory 39 provides a 32 bit random number which is encrypted within the encryptor on memory 39 and also passed across the bus 41 to be encrypted by the encryptor of memory 38. The encrypted number from memory 38 is passed back to the memory 39 and compared with the encrypted number encrypted within memory 39. If the results of the encryption are the same (direct comparison) then access to memory 39 is permitted as described above.

The advantage of having both memory 38 and 39 identical (except for programming) is that only a single part need be fabricated to implement the present invention. The memory 38 can be used for storing data or programs used by the computer system. Or, as will be described below, the memory 38 can also be programmed with a plurality of different 64-bit keys.

In some cases, it may be desirable to have a computer system which enables a plurality of memories, such as memory 39, each of which is programmed with a different key. In this case, the memory 39 would store a key number which is known and not secret, in addition to a key which is kept secret from the user. The key number through CPU 40 provides an address for the memory 38. With this address, a key is loaded from memory 38 into the key register of the encryptor. If the key loaded in memory 39 matches the key in the memory 38 access to the contents of memory 39, is permitted. The memory 38 with its large capacity can store many hundreds of different keys enabling many different memories to be authenticated. A key number, for instance, can be assigned to each software supplier for the computer system. In that way each supplier could have its own key.

PRESENTLY PREFERRED ENCRYPTOR

Figure 5:
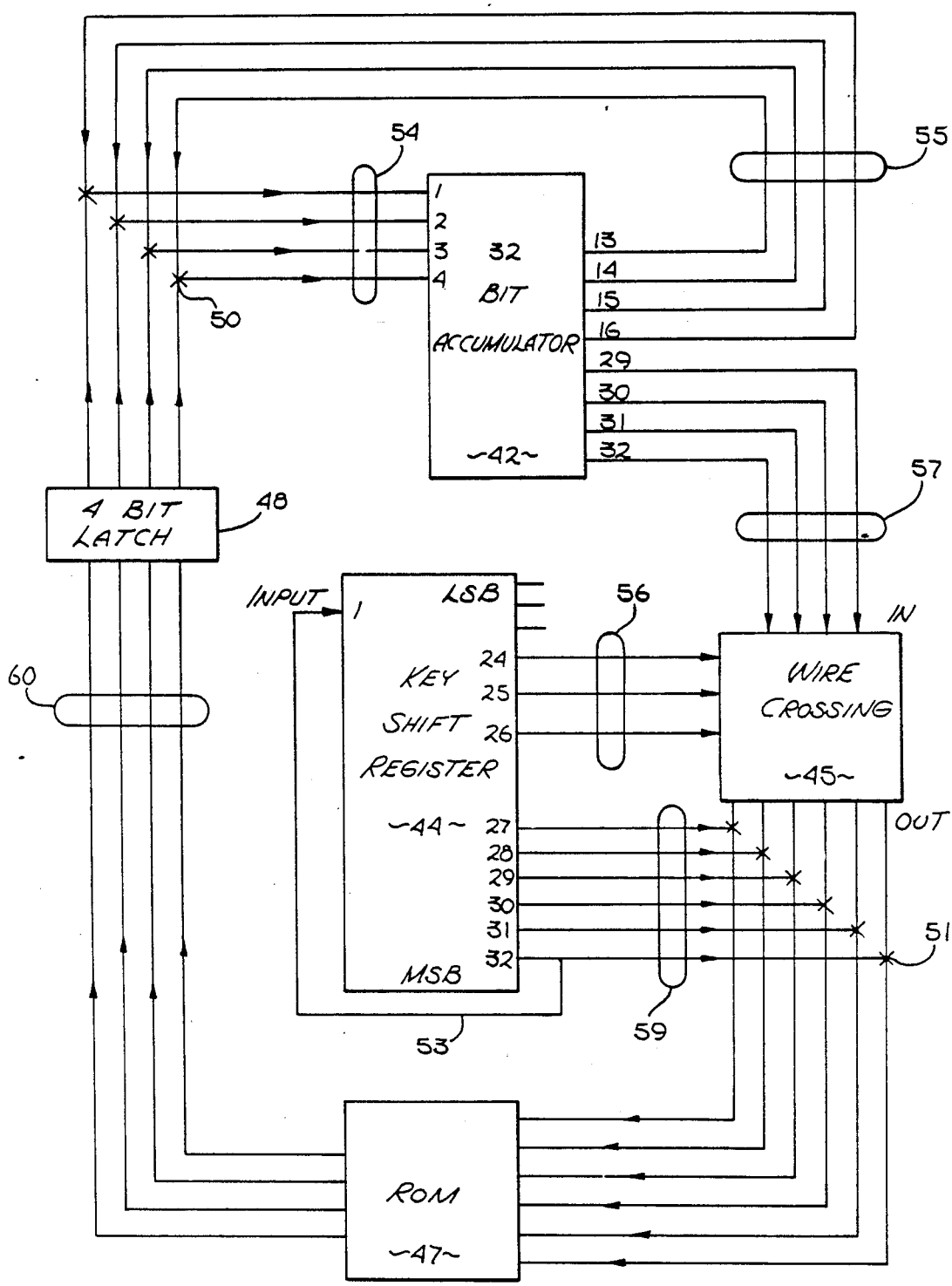
FIG. 5 is a circuit diagram for an encryptor used in the presently preferred embodiment of the invention.
Figure 6:
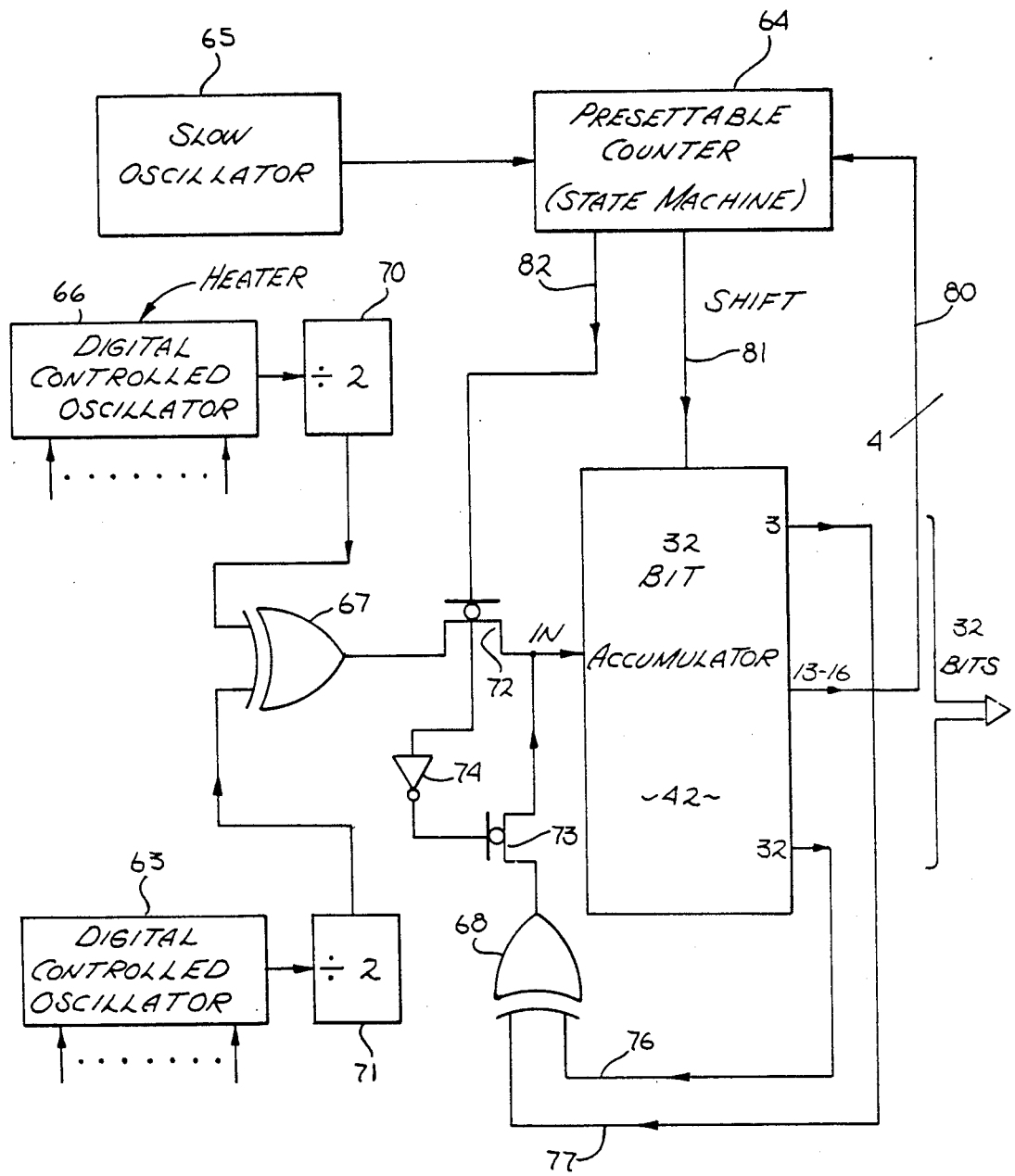
FIG. 6 is a block diagram for the presently preferred embodiment of the random number generator.
Figure 7:
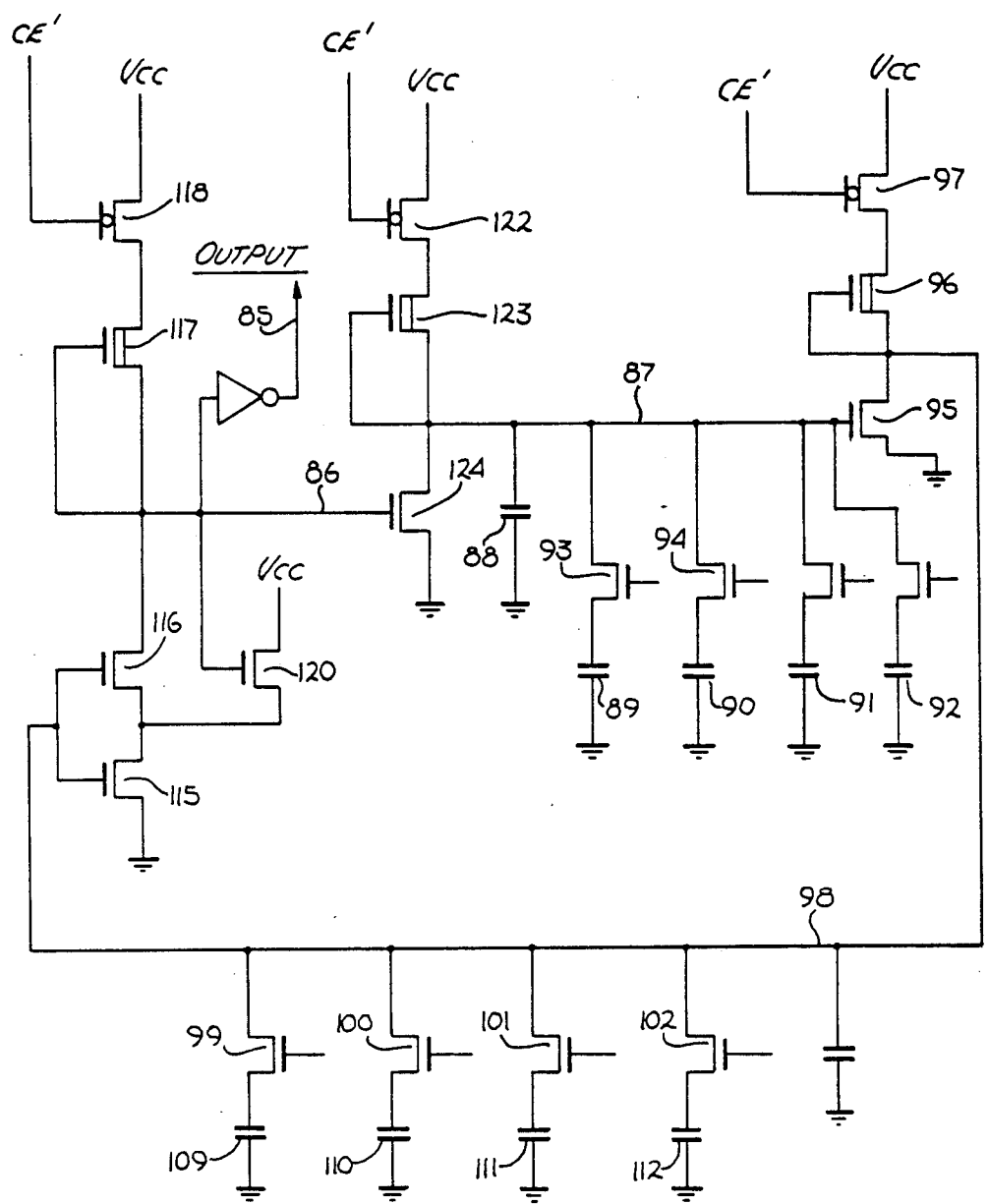
FIG. 7 is a circuit diagram of one of the digital controlled oscillators (DCO) used in the generator of FIG. 6.
Figure 8:
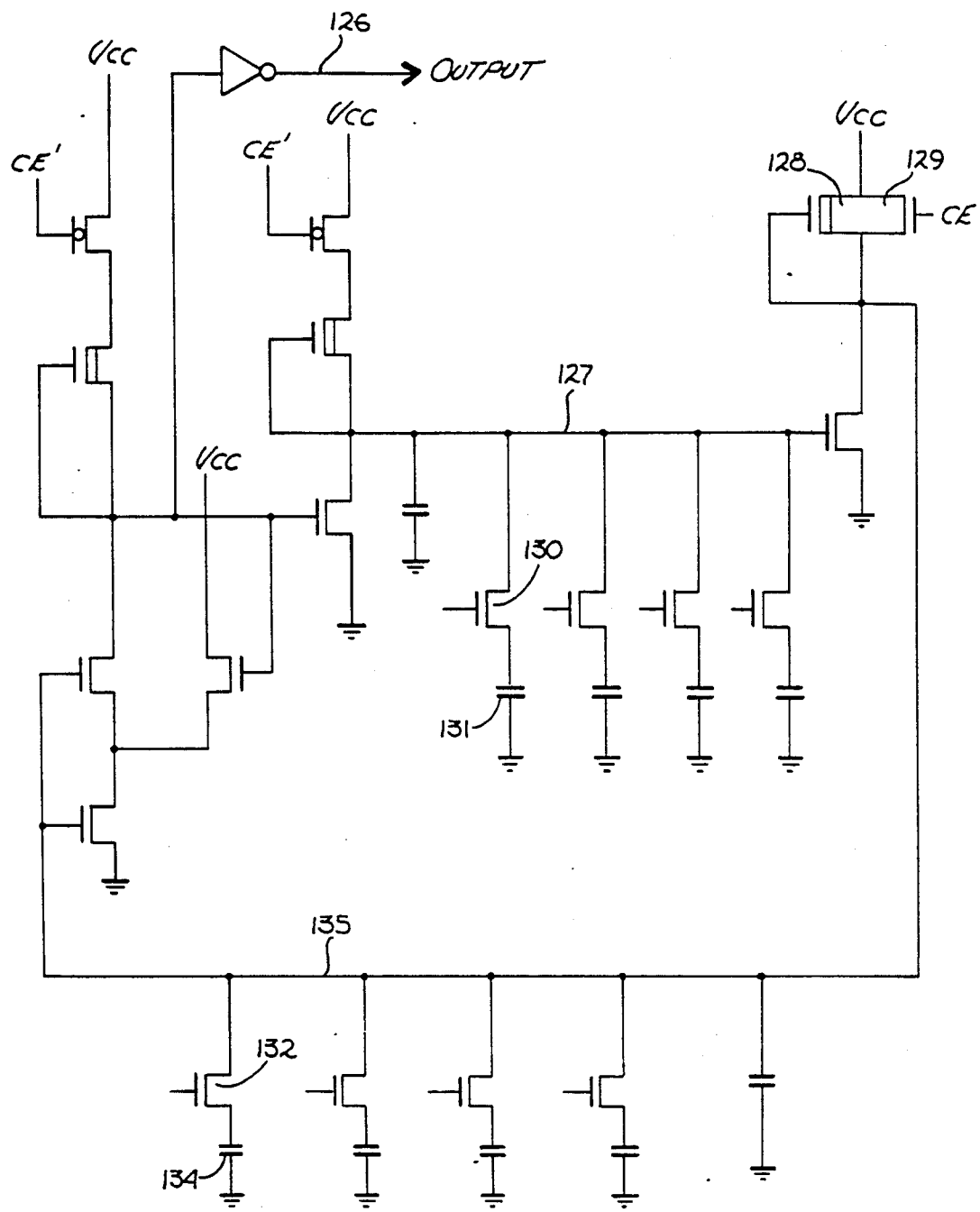
FIG. 8 is a circuit diagram of the other DCO used in the generator of FIG. 6.

The encryptor implemented in memories 38 and 39 is shown in FIG. 5. The random number generator which is integrated within both memories 38 and 39 is shown in FIGS. 6, 7, and 8. The comparator included within memories 38 and 39 is of ordinary construction and, hence, is not shown. Well-known circuits are used to prevent memory access of memory 39 until authentication.

Referring now to the encryptor of FIG. 5, it includes a 32 bit accumulator 42. The random number generated by the generator shown in FIGS. 6 through 8 is placed into this accumulator as will be described. The 13th, 14th, 15th, and 16th bits of this accumulator (lines 55) provide inputs to exclusive OR gates. The other inputs to these exclusive OR gates are the outputs of the 4 bit latch 48. For sake of simplicity, the OR gates have been shown as "x's" such as OR gate 50. The outputs of the OR gates are shown as lines 54 and are coupled to the input of the first four states of accumulator 42.

The 29th through 32nd bits in accumulator 42 are coupled via lines 57 to a wire crossing means 45. The signals on these lines are crossed as a function of the signals on lines 56 to provide 6 output signals at the output of the wire crossing means 45. The signals on lines 56 are the 24th, 25th, and 26th bit from the key shift register 44 (lines 56). Ordinary logic circuits are used for the wire crossing means 45. The specific crossings performed by the wire crossing means 45 are set forth below in Table 1.

TABLE 1

| PERMUTATION FROM WIRE CROSSING 45 | | | | | | | | | |
|---|---|---|---|---|---|---|---|---|---|
| KSR BIT | 24 | 0 | 1 | 0 | 1 | 0 | 1 | 0 | 1 |
|  | 25 | 0 | 0 | 1 | 1 | 0 | 0 | 1 | 1 |
|  | 26 | 0 | 0 | 0 | 0 | 1 | 1 | 1 | 1 |
|  |  | INPUTS | | | | | | | |
| OUTPUT | 1 | 3 | 3 | 3 | 3 | 3 | 3 | 3 | 3 |
|  | 2 | 1 | 1 | 1 | 1 | 2 | 2 | 2 | 2 |
|  | 3 | 4 | 4 | 4 | 4 | 4 | 4 | 4 | 4 |
|  | 4 | 2 | 2 | 2 | 2 | 1 | 1 | 1 | 1 |
|  | 5 | 1 | 2 | 1 | 2 | 2 | 1 | 2 | 1 |
|  | 6 | 3 | 3 | 4 | 4 | 3 | 3 | 4 | 4 |

The output signals from the wire crossing means 45 form inputs to exclusive OR gates 51. The other inputs to these six exclusive OR gates are lines 59 which contain the 27th through 32nd (most significant bits) within the register 44. The most significant bit on line 53, forms an input to the first stage of the register 44. The outputs of the exclusive OR gates 51 address a read-only memory, ROM 47. The four output bits from the ROM 47 (lines 60) are the input to the latch 48. The ROM 47 has a fixed program, that is, it is not programmable by the user; it substitutes a four bit digital number for each six bit digital number applied to its input. For example, if the input is all zeros, the output is a binary six, etc. Inasmuch as the ROM has only a four bit output, the same output occurs for different inputs. Error propagation coding is used in the presently preferred embodiment.

The accumulator 42 also performs a permutation function. With ordinary circuitry not shown the bits in each of the stages of the accumulator are interchanged or permutated. This fixed permutation is not programmable by the user and occurs at a point in the encryption which will be described below. When this permutation occurs, each bit is moved into a different stage of the register. For example, the bit in stage 1 is moved to stage 6, the bit in stage 2 is moved to stage 15, the bit in stage 3 is moved to stage 22, the bit in stage 4 is moved to stage 17, the bit in stage 5 is moved to stage 31, the bit in stage 6 is moved to stage 13, the bit in stage 7 is moved to stage 3, etc. The rule of the permutation presently preferred is that each bit from a nibble is moved to a different nibble.

OPERATION OF ENCRYPTOR OF FIG. 5

The encryptor of FIG. 5 operates in the following manner:

Step 1—a 32-bit random number is generated and loaded into the accumulator 42.

Step 2—the first 32-bits of the key (which is stored in the memory) are loaded into the register 44. The most significant bit of the 64-bit key being loaded into stage 32 of the register 44.

Step 3—the bits 29–32 from accumulator 42 pass through the wire crossing means 45 and are crossed in accordance with Table 1, of course as a function of the bits stored in register 44 at stages 24 through 26. The output of the wire crossing means 45 is then exclusively ORed with bits 27–32 of the key shift register 44. The resultant addresses accesses ROM 47 and the output 4 bits from ROM 47 are loaded in the 4 bit latch 48.

Step 4—The accumulator 42 is shifted by 4 bits such that the bit at stage 28 is shifted to stage 32.

Step 5—The four bits from the latch 48 are exclusively ORed with the bits at stages 13–16 of accumulator 42 and the resultant 4 bits are shifted in a parallel manner over lines 54 into the first four stages of the accumulator 42.

Step 6—Steps 3–5 are repeated seven more times (that is, steps 3–5 are performed eight times) before proceeding to step 7.

Step 7—The 32-bit permutation within the accumulator 32 is performed.

Step 8—The key shift register 44 is rotated by six bits such that stage 32 contains the bit which was stored in stage 25 (bits are shifted back into stage 1 through line 53).

Step 9—Steps 3–8 are repeated until these steps have been repeated a total of 54 times, before proceeding to step 10.

Step 10—The key shift register 44 is loaded with the second 32 bits of the key, and then steps 3–9 are repeated.

The encrypted 32 bit number will then be stored within the accumulator 42. This encryption, of course, is occurring in both the memories 38 and 39. If both memories are using the same key, the results of the encryption will be identical when the numbers are compared.

As previously mentioned, the encryption intentionally proceeds at a slow rate and takes approximately 1 second to complete. This is sufficiently fast so as not to annoy a user and yet slow enough to require decades to try all the possibilities of the 64 bit key.

PRESENTLY PREFERRED RANDOM NUMBER GENERATION

The effectiveness of the above described encryption apparatus is dependent on the generation of a random digital number. While perhaps in theory it is impossible to generate a truly random number, as will be described below, a substantial effort is taken to generate a random (pseudo random) digital number.

Referring to FIG. 6, in general, the output of two relatively fast digitally controlled oscillators (DCO) 63 and 66 are exclusively ORed and gated by a relatively slow DCO oscillator 65. Care is taken to assure that the oscillators are asynchronous. Moreover, as will be described first, a "seed" number is gernerated and used to generate a random number. Prior art random number generators are known to employ two asynchronous oscillators, one gating the other and also to use seeding. See, *Journal of Computational Physics*, Vol. 40, pp. 517–526 (1981) "A Very Fast Shift-Register Sequence Random Number Generator"; The Art of Computer Programming, Knuth, Vol. 2, Addison-Wesley (1969); "Fortune Wheel Process for Generating Pseudo-Random Numbers" by Thomas C. Anderson (of Lockheed) *Instruments and Control systems*, January, 1962, Page 129; and U.S. Pat. Nos. 3,609,327; 3,811,038; 3,761,696 and 3,777,278.

Oscillator 63 is a "depletion" DCO and is shown in detail in FIG. 7. The "enhancement" oscillator is shown in detail in FIG. 8. Oscillator 63 has a nominal period of 50 nanoseconds whereas oscillator 66 has a nominal period of approximately 60 nanoseconds. Both oscillators receive different digital signals from the accumulator 42 causing them to change their frequencies (the seed number is used for this purpose). Additionally, a heater is fabricated on the substrate close to the oscillator 66 causing it to be unstable and thus, causing its frequency to vary. (The heater is formed by drawing through a transistor more current than is normally drawn.)

The output of the oscillator 63 is divided by two by divider 71 and coupled to one input of exclusive OR gate 67. Similarly, the output of oscillator 66 is divided by two through divider 70 and coupled to the other input terminal of the gate 67. The gate 67 is coupled through zero threshold transistor 72 into the first stage of the accumulator 42. The shifting within the accumulator 42 is controlled by the signal on line 81 which is received from the pre-settable counter 64. When a signal is present on line 82, the signals from the gate 67 are transferred through the transistor 72 into the accumulator. When no signal is present on line 82, the inverter 74 causes transistor 73 to conduct. When this occurs, the digital signals on lines 76 and 77 after being exclusively ORed in gate 68, are coupled through transistors 73 into the accumulator. Lines 76 and 77 are coupled to spaced-apart stages of the accumulator 42. Four bits from the accumulator 42 are coupled through lines 80 to the pre-settable counters 64.

The pre-settable counter operates substantially under control of the slow oscillator 65 for part of the number generation cycle. (The oscillator 65 has a period of approximately 2000 nanoseconds and is fabricated as an ordinary ring oscillator employing three inverter stages.) The pre-settable counter 64 performs certain logic functions and operates to some extent as a "state machine" as will be described. The counter operates as a modulo 32+N counter and counts to 32 plus the random number shifted into the counter from the accumulator 42 on lines 80.

Initially, a 32 bit number is shifted into the accumulator from transistor 72. The exclusive ORing of the outputs of the oscillators 63 and 66 provides a relatively random signal at the output of gate 67. This is further randomized by the fact that the output of gate 67 is shifted at a rate determined by the oscillator 65. (The oscillator 65 determines the shifting rate through line 81 during this period.) Once a 32 bit number as been shifted into the accumulator, it is used as a seed for another random number. Some of these bits are used to change the frequency of the oscillator 63 and 66 as will be discussed in conjunction with FIGS. 7 and 8. The bits 13 through 16 in the accumulator are transferred via lines 80 to present counter 64. Now another 32 bits is transferred into the accumulator 42 from the gate 67 through transistor 72 under control of the timing signal from the slow oscillator 65. The number that was preset in the counter 64 from lines 80 is added to 32 giving N. The accumulator is now recirculated through the exclusive OR gate 68 and transistor 73 (during this period the signal on line 82 is low). The stepping through the OR gate occurs N times. Now the 32 bit number stored within the accumulator 42 is used as the random number for the encryptors.

Thus, in summary, a first random number is generated within the accumulator 42 and used to vary the oscillators 63 and 66 and the counter 64. A second number is then generated which is more randomized since the frequencies of the oscillators 63 and 66 are being varied based on the first (seed) random number. After the second random number has been placed in accumulator 42 it is further randomized based on the number set within the counter 64. This again is based on the seed. In general, a large number of DCOs can be exclusively ORed and "feedback controlled" as described to provide a pseudo-random number.

OSCILLATOR OF FIG. 7

Referring now to FIG. 7, the depletion DCO 63 of FIG. 6 operates as a general feedback oscillator. Node 98 is charged through the transistors 96 and 97, and the potential on this node controls the conduction of the transistors 115 and 116. Node 86 is charged through transistors 117 and 118 and discharged through transistors 115 and 116. The potential on node 86 controls transistor 124 and this transistors controls the discharging of node 87. Node 87 is charged through transistors 122 and 123. The potential on node 87 through transistor 95 controls the discharging of the node 98. An output signal (line 85) is taken from node 86 through an inverter. Transistors 97, 118 and 122 are controlled by a chip enable signal. Thus, the oscillator only operates when this signal is present. Transistor 120 charges the node between transistors 115 and 116.

The rate of oscillator of FIG. 7 is primarily dependent upon the rate at which nodes 87 and 98 are charged and discharged. To a large extent this is dependent upon the capacitance associated with each of these nodes. Node 87 includes a fixed capacitor 88 and capacitors 89, 90, 91 and 92 which are selectively coupled to node 87. Similarly, node 98 includes a fixed capacitor and capacitors 109, 110, 111 and 112 which are selectively coupled to the node 98 by the transistors 99, 100, 101 and 102, respectively. The transistors coupled in series with capacitors 89–92 and 109–112 have their gates coupled to different stages of the accumulator 42. By way of example, capacitor 89 is coupled to node 89 if a binary one is present at stage 14 since transistor 93 conducts and similarly, capacitor 90 is decoupled from node 89 if a binary zero is present at stage 14 since transistor 94 does not conduct.

The first random number generated within the accumulator 42 is used to vary the capacitance on nodes 87 and 88. As this seed number is shifted in the accumulator (when the second random number is generated) the capacitance of nodes changes with each shift thus varying the frequency of oscillation. This assures more randomness of the final number.

The rate at which node 98 is charged is a function of the threshold voltage of the depletion mode transistor 96. Hence, the oscillator of FIG. 7 is referred to as a depletion DCO. The corresponding node in the oscillator of FIG. 8 is charged through an enhancement mode transistor. The threshold voltages of these transistors (one enhancement and one depletion) vary in opposite directions particularly with VCC changes. Thus, as the potential (VCC) of the chip changes the rate of oscillations of the oscillator of FIGS. 7 and 8 change in opposite directions. This helps in preventing the oscillators from becoming synchronous.

OSCILLATOR OF FIG. 8

The oscillator of FIG. 8 (oscillator 66 of FIG. 6) is quite similar to the oscillator of FIG. 7. It again includes two nodes 127 and 135 which include capacitors which are selectively coupled to these nodes as a function of the random number in the accumulator 42 of FIG. 6. For instance, capacitor 131 is coupled to node 127 when transistor 130 conducts. This transistor conducts when a binary one is in stage 3 of the accumulator. Similarly, capacitor 134 is coupled to node 135 through transistor 132 when a binary one is in stage 20 of the accumulator. An output signal is taken from the oscillator at line 126 in a similar manner to the output from the oscillator of FIG. 7.

The rate at which node 135 charges is primarily a function of the threshold voltage of the enhancement mode transistor 129. As mentioned, this enhancement mode transistor causes the oscillator of FIG. 7 to have different characteristics than the oscillator of FIG. 8. Additionally, as previously mentioned, the oscillator of FIG. 8 includes a heater to further increase the instability of this oscillator.

SUMMARY OF OPERATION OF PRESENTLY PREFERRED EMBODIMENT

To summarize the operation of the preferred embodiment of FIG. 4, the memory 39 (since it is the originator mode) generates a random number. This random number is transferred via bus 41 to the memory 38 which is in the recipient mode. Both memories 38 and 39 include the encryptor of FIG. 5 and if both have the same key stored within them, both will generate the same encrypted number. The encrypted number from the memory 38 is transferred across the bus 41 to memory 39. Within memory 39 the encrypted numbers are compared and if they are identical, access is permitted to the contents stored within the memory 39. If they are not identical, access is not permitted; for instance, access is blocked by causing all data output signals to become binary ones.

Thus, an apparatus has been described which limits access to the contents of a memory unless the memory is in a particular environment. This makes the copying of the contents of the memory more difficult. Also, even if the contents of the memory are copied, it will be difficult to use the contents of the copied memory in a system which is intended to be used with an authenticated memory. The hand shake used during the authentication will not occur and prevents the system from normally operating with the copied memory.

We claim:

1. A random number generator for generating a random digital number comprising:
- a first, second and third oscillators, said first oscillator oscillating at a relatively lower frequency when compared to said second and third oscillators;
- first gating means coupled to receive the output of said second and third oscillators;
- a counter coupled to receive an output of said first oscillator, wherein said first oscillator frequency determines a counting rate of said counter;
- second gating means operating under control of said counter for gating signals from said first gating means;
- an accumulator means for accumulating a digital number coupled to receive signals from said second gating means, said accumulator being coupled to said second and third oscillators for varying the frequency of oscillations of said second and third oscillators;
- said accumulator also coupled to said counter, wherein a portion of an output of said accumulator determines a preset value of said counter;
- third gating means also operating under control of said counter for gating selected output lines of said accumulator as feedback to input of said accumulator, wherein said accumulator is shifted a predetermined number of times to further accumulate said digital number when said second gating means is inactive;
- whereby a random number is generated within said accumulator.

2. The generator defined by claim 1 wherein said generator is a metal-oxide-semiconductor (MOS) integrated circuit and wherein;
- one of said second and third oscillators includes a first node charged through an enhancement mode device, where the rate of charging of said first node effects the frequency of said oscillation of said second oscillator; and,
- said third oscillator includes a second node charged through a depletion mode device, where the rate of charging said second node effects the frequency of oscillations of said third oscillator.

3. The generator defined by claim 2 wherein one of said second and third oscillators includes a heater which causes more unstable oscillations.

* * * * *